United States Patent
Tu et al.

(10) Patent No.: US 10,306,070 B2
(45) Date of Patent: May 28, 2019

(54) CALL TRANSFER METHOD AND USER EQUIPMENT

(71) Applicant: Huawei Technologies Co., Ltd., Shenzhen (CN)

(72) Inventors: Yongfeng Tu, Shenzhen (CN); Wenmei Gao, Beijing (CN); Zhu Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 245 days.

(21) Appl. No.: 15/315,500

(22) PCT Filed: Jul. 29, 2014

(86) PCT No.: PCT/CN2014/083211
§ 371 (c)(1),
(2) Date: Dec. 1, 2016

(87) PCT Pub. No.: WO2016/015217
PCT Pub. Date: Feb. 4, 2016

(65) Prior Publication Data
US 2017/0094061 A1 Mar. 30, 2017

(51) Int. Cl.
*H04M 3/58* (2006.01)
*H04W 4/16* (2009.01)
(Continued)

(52) U.S. Cl.
CPC .............. *H04M 3/58* (2013.01); *H04M 1/006* (2013.01); *H04M 3/02* (2013.01);
(Continued)

(58) Field of Classification Search
CPC .. H04M 1/006; H04M 2250/10; H04M 15/06; H04M 15/745; H04M 19/04;
(Continued)

(56) References Cited

U.S. PATENT DOCUMENTS

2005/0053206 A1* 3/2005 Chingon ............... H04M 1/573
379/88.19
2005/0053218 A1 3/2005 Kim et al.
(Continued)

FOREIGN PATENT DOCUMENTS

| CN | 1394061 A | 1/2003 |
|---|---|---|
| CN | 1553687 A | 12/2004 |

(Continued)

OTHER PUBLICATIONS

Machine Translation and Abstract of Chinese Publication No. CN1394061, Jan. 29, 2003, 8 pages.
(Continued)

*Primary Examiner* — Erica Navar (74) *Attorney, Agent, or Firm* — Conley Rose, P.C.

(57) ABSTRACT

A call transfer method and user equipment relate to the communications field, where the method includes acquiring a phone number of a current call to first user equipment, determining whether the phone number of the current call is a trigger number, determining whether a ring parameter corresponding to the number of the call meets a preset condition when the phone number of the current call is the trigger number, and sending a call transfer instruction to a server when the ring parameter corresponding to the number of the call meets the preset condition such that when a number of a call is a trigger number and a ring parameter corresponding to the number of the call meets a preset condition, the call to first user equipment is transferred.

20 Claims, 4 Drawing Sheets

(51) Int. Cl.
  *H04M 1/00* (2006.01)
  *H04M 3/54* (2006.01)
  *H04M 3/02* (2006.01)
  *H04M 3/42* (2006.01)
  *H04M 19/04* (2006.01)

(52) U.S. Cl.
  CPC ......... *H04M 3/42059* (2013.01); *H04M 3/54* (2013.01); *H04M 19/04* (2013.01); *H04W 4/16* (2013.01); *H04M 2201/18* (2013.01)

(58) Field of Classification Search
  CPC .... H04M 1/57; H04M 1/663; H04M 1/72513; H04M 1/72572; H04M 2203/1091; H04M 2203/158; H04M 2215/0708; H04M 2242/30; H04M 3/02; H04M 3/42051; H04M 3/42059; H04M 3/42068; H04M 3/4211; H04M 3/42229; H04M 3/42263; H04M 3/436; H04M 3/54; H04M 2201/18; H04M 3/58; H04W 48/16; H04W 4/02; H04W 4/025; H04W 4/16; H04W 52/0241; H04W 8/186
  See application file for complete search history.

(56) References Cited

U.S. PATENT DOCUMENTS

| | | |
|---|---|---|
| 2006/0116104 A1 | 6/2006 | Yang |
| 2006/0166678 A1 | 7/2006 | Karaoguz et al. |
| 2009/0086947 A1 | 4/2009 | Vendrow |
| 2009/0323919 A1 | 12/2009 | Toner et al. |
| 2012/0028618 A1* | 2/2012 | Goel ................. H04W 36/385 455/414.1 |

FOREIGN PATENT DOCUMENTS

| | | |
|---|---|---|
| CN | 1783923 A | 6/2006 |
| CN | 101163174 A | 4/2008 |
| CN | 100508541 A | 7/2009 |
| CN | 201278588 Y | 7/2009 |
| CN | 102014349 A | 4/2011 |
| CN | 102918823 A | 2/2013 |
| CN | 103181152 A | 6/2013 |
| CN | 103888912 A | 6/2014 |
| EP | 2061217 A2 | 5/2009 |

OTHER PUBLICATIONS

Foreign Communication From a Counterpart Application, Chinese Application No. 201480036842.0, Chinese Office Action dated Jun. 27, 2017, 7 pages.
Machine Translation and Abstract of Chinese Publication No. CN1553687, Dec. 8, 2004, 5 pages.
Machine Translation and Abstract of Chinese Publication No. CN102014349, Apr. 13, 2011, 3 pages.
Machine Translation and Abstract of Chinese Publication No. CN100508541, Jul. 1, 2009, 7 pages.
Machine Translation and Abstract of Chinese Publication No. CN102918823, Feb. 6, 2013, 12 pages.
Foreign Communication From a Counterpart Application, European Application No. 14898770.4, Extended European Search Report dated Apr. 21, 2017, 8 pages.
Foreign Communication From a Counterpart Application, PCT Application No. PCT/CN2014/083211, English Translation of International Search Report dated Mar. 30, 2015, 3 pages.
Foreign Communication From a Counterpart Application, PCT Application No. PCT/CN2014/083211, English Translation of Written Opinion dated Mar. 30, 2015, 3 pages.

* cited by examiner

CALL TRANSFER METHOD AND USER EQUIPMENT

CROSS-REFERENCE TO RELATED APPLICATIONS

This application is a U.S. national stage of International Application No. PCT/CN2014/083211, filed on Jul. 29, 2014, which is hereby incorporated by reference in its entirety.

TECHNICAL FIELD

The present disclosure relates to the communications field, and in particular, to a call transfer method and user equipment.

BACKGROUND

In the prior art, first user equipment (such as a smartphone) having a call transfer function may transfer a call to itself to second user equipment using the call transfer function such that when the first user equipment is unavailable, a user can answer the call to the first user equipment using the second user equipment. However, how to transfer a call to the first user equipment to the second user equipment using the call transfer function becomes one of problems that need to be resolved by call transfer.

The prior art provides a call transfer method, where the method includes making a call for setting to a network in which first user equipment is located, and then under the guidance of a network side, remotely setting a call transfer function of the first user equipment, and transferring a call to the first user equipment to second user equipment by means of manual setting. The prior art also provides another call transfer method, where the method includes sending a short message service message including an activation instruction and a phone number of second user equipment to first user equipment, and after the first user equipment receives the short message service message, activating, by the first user equipment, a call transfer function of the first user equipment, and transferring a call to the first user equipment to the second user equipment.

Because the first method provided by the prior art requires a network side and a user to perform manual setting, while in the other method provided by the prior art, a user needs to edit an activation instruction and a phone number in a short message service message, operation processes of the two methods are complex. As a result accuracy of the call transfer is reduced when a user performs call transfer using the foregoing two methods.

SUMMARY

Embodiments of the present disclosure provide a call transfer method and user equipment such that when a number of a call is a trigger number and it is determined that a ring parameter corresponding to the number of the call meets a preset condition, the call to first user equipment is transferred, thereby improving accuracy of call transfer and improving an interactive capability of the user equipment. The technical solutions are as follows.

According to a first aspect, user equipment is provided, where the user equipment includes an acquiring unit configured to acquire a phone number of a current call to first user equipment, a determining unit configured to determine whether the phone number of the current call is a trigger number, where when the phone number of the current call is the trigger number, the determining unit is further configured to determine whether a ring parameter corresponding to the number of the call meets a preset condition, where the ring parameter includes a quantity of rings and/or duration of a ring, and a sending unit configured to send a call transfer instruction to a server if the ring parameter corresponding to the number of the call meets the preset condition, where the call transfer instruction is used to instruct the server to transfer, after receiving the call transfer instruction, the call to the first user equipment to second user equipment corresponding to the number of the call.

With reference to the first aspect, in a first possible implementation manner, the determining unit is further configured to perform at least one of determining that a time of the current call is within a working period, determining that a location of the first user equipment is a preset location, and determining that the first user equipment is not connected to a wearable device.

With reference to the first aspect or the first possible implementation manner of the first aspect, in a second possible implementation manner, the user equipment further includes a setting unit, where the setting unit is configured to receive a setting instruction input by a user, and set and store at least one trigger number according to the setting instruction.

With reference to any one of the first aspect to the second possible implementation manner of the first aspect, in a third possible implementation manner, the sending unit is further configured to send first prompt information to the second user equipment, where the first prompt information is used to indicate that the call to the first user equipment is already transferred to the second user equipment.

With reference to any one of the first aspect to the third possible implementation manner of the first aspect, in a fourth possible implementation manner, the sending unit is further configured to send, to a sending device that sends the short message service message, third prompt information that is used to indicate that the call to the first user equipment is already transferred to the second user equipment after receiving a short message service message.

According to a second aspect, a call transfer method is provided, where the method includes acquiring a phone number of a current call to first user equipment, determining whether the phone number of the current call is a trigger number, determining whether a ring parameter corresponding to the number of the call meets a preset condition if the phone number of the current call is the trigger number, where the ring parameter includes a quantity of rings and/or duration of a ring, and sending a call transfer instruction to a server if the ring parameter corresponding to the number of the call meets the preset condition, where the call transfer instruction is used to instruct the server to transfer the call to the first user equipment to second user equipment corresponding to the number of the call.

With reference to the second aspect, in a first possible implementation manner, before transferring the call to the first user equipment to second user equipment corresponding to the number of the call, the method further includes at least one of determining that a time of the current call is within a working period, determining that a location of the first user equipment is a preset location, and determining that the first user equipment is not connected to a wearable device.

With reference to the second aspect or the first possible implementation manner of the second aspect, in a second possible implementation manner, receiving a setting instruction input by a user, and setting and storing at least one trigger number according to the setting instruction.

With reference to any one of the second aspect to the second possible implementation manner of the second aspect, in a third possible implementation manner, after transferring the call to the first user equipment to second user equipment corresponding to the number of the call, the method further includes sending first prompt information to the second user equipment, where the first prompt information is used to indicate that the call to the first user equipment is already transferred to the second user equipment.

With reference to any one of the second aspect to the third possible implementation manner of the second aspect, in a fourth possible implementation manner, after transferring the call to the first user equipment to second user equipment corresponding to the number of the call, the method further includes sending second prompt information to a sending device that sends the short message service message after receiving a short message service message, where the second prompt information is used to indicate that the call to the first user equipment is already transferred to the second user equipment.

According to a third aspect, user equipment is provided, where the user equipment includes a transmitter, a receiver, a memory, and a processor that communicates separately with the transmitter, the receiver, and the memory, where the memory stores a set of program code, and the processor is configured to invoke the program code stored in the memory to perform the following operations. The processor is configured to acquire a phone number of a current call to first user equipment, determine whether the phone number of the current call is a trigger number, and determine whether a ring parameter corresponding to the number of the call meets a preset condition if the phone number of the current call is the trigger number, where the ring parameter includes a quantity of rings and/or duration of a ring, and the transmitter is configured to send a call transfer instruction to a server if the ring parameter corresponding to the number of the call meets the preset condition, where the call transfer instruction is used to instruct the server to transfer the call to the first user equipment to second user equipment corresponding to the number of the call.

With reference to the third aspect, in a first possible implementation manner, before sending the call transfer instruction to the server, the processor is configured to perform at least one of determining that a time of the current call is within a working period, determining that a location of the first user equipment is a preset location, and determining that the first user equipment is not connected to a wearable device.

With reference to the first aspect or the first possible implementation manner of the first aspect, in a second possible implementation manner, before determining whether the phone number of the current call is the trigger number, the processor is further configured to receive a setting instruction input by a user, and set and store at least one trigger number according to the setting instruction.

With reference to any one of the first aspect to the second possible implementation manner of the first aspect, in a third possible implementation manner, the transmitter is further configured to send first prompt information to the second user equipment, where the first prompt information is used to indicate that the call to the first user equipment is already transferred to the second user equipment.

With reference to any one of the first aspect to the third possible implementation manner of the first aspect, in a fourth possible implementation manner, the receiver is configured to receive a short message service message, and after the receiver receives a short message service message, the transmitter is further configured to send second prompt information to a sending device that sends the short message service message, where the second prompt information is used to indicate that the call to the first user equipment is already transferred to the second user equipment.

The embodiments of the present disclosure provide a call transfer method and user equipment such that when a number of a call is a trigger number and it is determined that a ring parameter corresponding to the number of the call meets a preset condition, the call to first user equipment is transferred, thereby improving accuracy of call transfer and improving an interactive capability of the user equipment.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

It should be noted that in embodiments of the present disclosure, two clauses connected using "if . . . , . . . " only mean that the previous clause is a condition for the following clause. For example, for "if a preset condition is met, a preset operation is performed," for the preset operation, in an actual application, the current preset operation may be performed when only the preset condition is met, or the current preset operation may be performed when the preset condition and another preset condition are both met. Using an embodiment of the present disclosure as an example, after determining that a number of a call is a trigger number and the number of the call meets a preset condition, first user equipment may send a call transfer instruction to a server, or after determining that a number of a call is a trigger number and determining that a ring parameter corresponding to the number of the call meets a preset condition and another preset condition, the first user equipment may send a call transfer instruction to a server.

An embodiment of the present disclosure provides a call transfer method, where the method is applied to first user equipment having a call transfer function, application scenarios of the method may include scenario 1 which indicates a user leaves the first user equipment at a first location and the user uses second user equipment at a second location, and scenario 2 which indicates the user uses both the first user equipment and the second user equipment at the second location, but the user cannot answer a call to the first user equipment, where the first location and the second location are preset, and the first location may be residence of the user, and the second location may be a working place of the user, and the application scenarios of the method provided by this embodiment of the present disclosure may further include a scenario in which another user cannot answer a call to the first user equipment but can answer a call to the second user equipment, which is not limited in this embodiment of the present disclosure.

Figure 1:
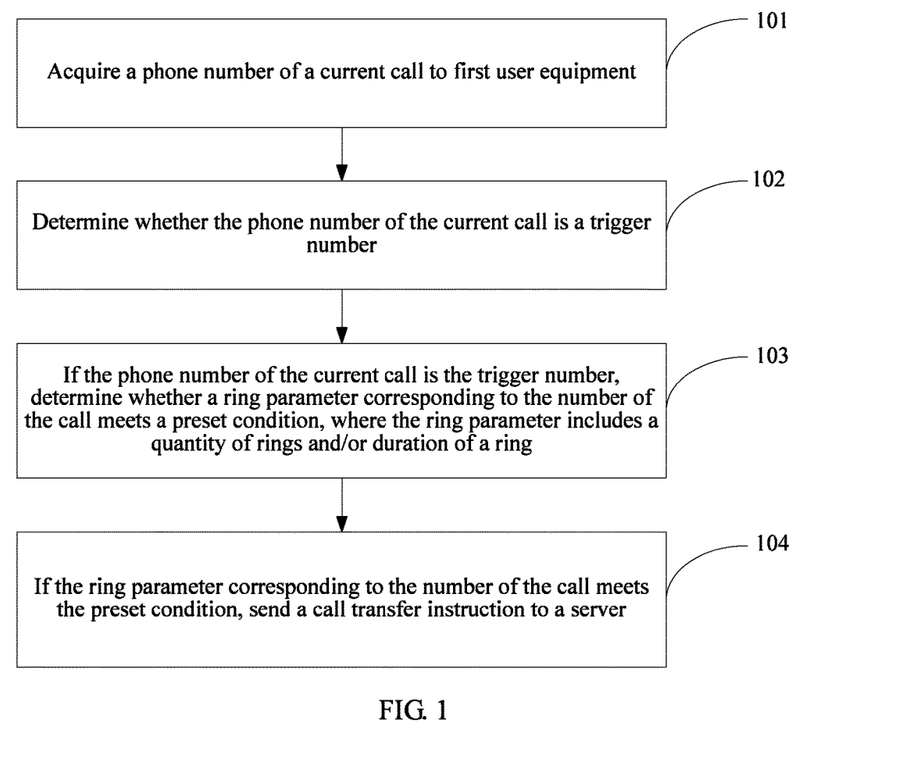
FIG. 1 is a flowchart of a call transfer method according to an embodiment of the present disclosure.

An embodiment of the present disclosure provides a call transfer method. Referring to FIG. 1, the method includes the following steps.

Step 101: Acquire a phone number of a current call to first user equipment.

Before step 101, the first user equipment receives a setting instruction input by a user and sets and stores at least one trigger number according to the setting instruction, where the trigger number includes a fixed-line phone number and a mobile phone number.

Optionally, when there is a call to the first user equipment, step 101 is triggered to acquire call information of the current call, and the first user equipment parses the call information to acquire the phone number of the current call.

Step 102: Determine whether the phone number of the current call is a trigger number.

Because the trigger number is a number that triggers the first equipment to perform call transfer, the trigger number may be a fixed-line phone number or a mobile phone number. Matching may be performed between the number of the call and each trigger number stored by the first user equipment, and it is determined, according to a matching result, whether the number of the call is the trigger number.

Optionally, the first user equipment may also preset a number determining algorithm, input the number of the call to the number determining algorithm, and determine, according to an output result of the number determining algorithm, whether the number of the call is the trigger number.

Step 103: If the phone number of the current call is the trigger number, determine whether a ring parameter corresponding to the number of the call meets a preset condition, where the ring parameter includes a quantity of rings and/or duration of a ring.

Before step 103, the ring parameter needs to be acquired in advance. Optionally, an acquiring process includes, but is not limited to, the following manners receiving a ring parameter sent by a server, or locally receiving a setting instruction input by user equipment, and setting a ring parameter according to the setting instruction.

The ring parameter may include, but is not limited to, a quantity of rings and/or duration of a ring. Correspondingly, determining whether a ring parameter corresponding to the number of the call meets a preset condition may include determining, in a preset time, whether the quantity of rings is greater than or equal to a preset quantity, or determining whether the duration of the ring is greater than or equal to a preset time, where the duration of the ring is determined according to a first time when the ring starts and a second time when the ring ends.

Step 104: If the ring parameter corresponding to the number of the call meets the preset condition, send a call transfer instruction to a server.

This embodiment of the present disclosure provides a call transfer method and user equipment such that when a number of a call is a trigger number and it is determined that a ring parameter corresponding to the number of the call meets a preset condition, the call to first user equipment is transferred, thereby improving accuracy of call transfer and improving an interactive capability of the user equipment.

Figure 2:
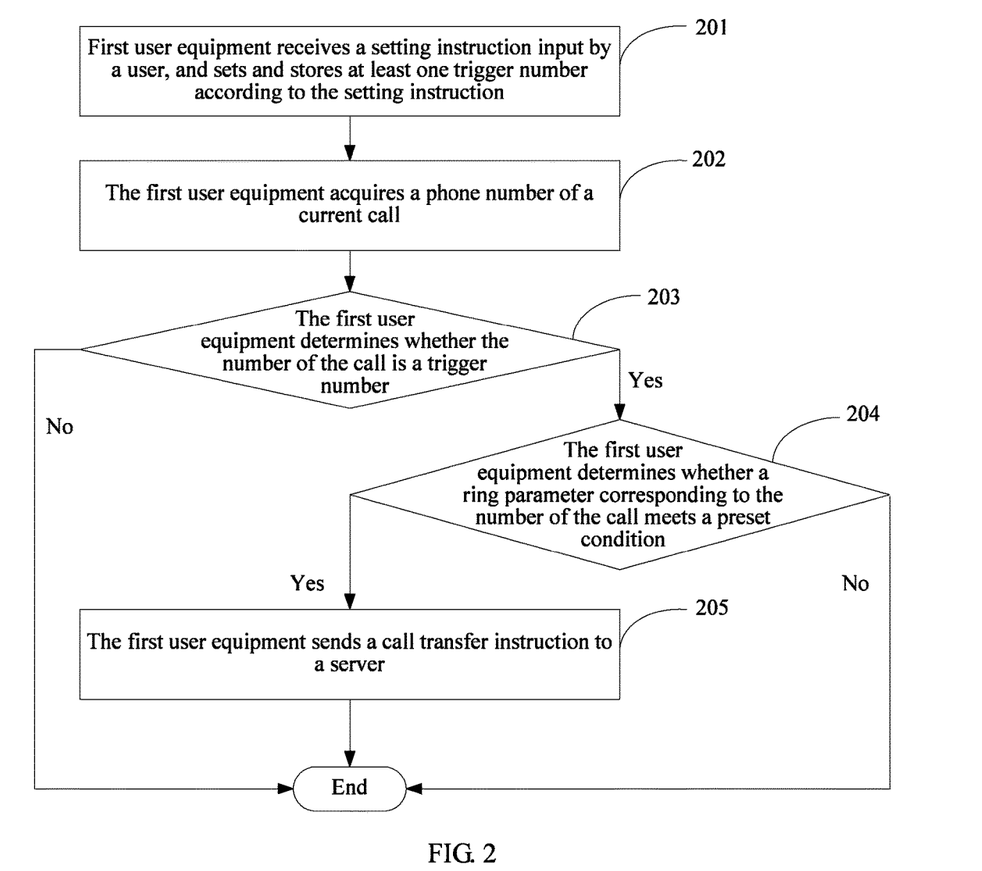
FIG. 2 is a flowchart of a call transfer method according to another embodiment of the present disclosure.

Another embodiment of the present disclosure provides a call transfer method. Referring to FIG. 2, the method includes the following steps.

Step 201: First user equipment receives a setting instruction input by a user, and sets and stores at least one trigger number according to the setting instruction.

Optionally, the first user equipment may display a number setting interface for the user, then receive a setting instruction triggered by the user on the number setting interface, acquire, according to the setting instruction, a phone number indicated by the setting instruction from at least one phone number stored by the first user equipment, set the phone number as a trigger number, and store the trigger number.

The first user equipment may also display, after the user manually inputs a phone number, a number setting interface corresponding to the phone number for the user such that the user can use the number setting interface to trigger a setting instruction, and after receiving the setting instruction, the first user equipment sets the phone number manually input by the user as a trigger number according to the setting instruction and stores the trigger number.

The first user equipment may also display, after receiving a phone number sent by another user equipment or a network device, a number setting interface corresponding to the phone number for the user, and then receive a setting instruction triggered by the user on the number setting interface, and the user equipment sets the received phone number as a trigger number according to the setting instruction and stores the trigger number.

In addition, the first user equipment may also set and store a trigger number in another manner, which is not limited thereto.

It should be noted that step 201 is a process of setting and storing the at least one trigger number, and in an actual application, in a process after step 202 and step 202 are performed by the first user equipment, the first user equipment can directly use the set and stored trigger number.

Step 202: The first user equipment acquires a phone number of a current call.

Optionally, step 202 may be triggered to acquire call information of the current call when there is a call to the first user equipment.

The first user equipment parses the call information to acquire the phone number of the current call.

Because the call information may be a dual tone multi frequency (DTMF) signal of the current call, after acquiring the DTMF signal of the current call, the first user equipment may parse the DTMF signal, and acquires the phone number of the current call by parsing the DTMF signal.

A specific parsing process is not limited in this embodiment of the present disclosure.

Step 203: The first user equipment determines whether the number of the call is a trigger number, and performs step 204 if the number of the call is the trigger number, and ends the process if the number of the call is not the trigger number.

Optionally, the first user equipment may perform matching between the number of the call and each trigger number stored by the first user equipment, and it is determined, according to a matching result, whether the number of the call is the trigger number.

Optionally, the first user equipment may also preset a number determining algorithm, input the number of the call to the number determining algorithm, and determine, according to an output result of the number determining algorithm, whether the number of the call is the trigger number.

In addition, the first user equipment may also determine, in another manner, whether the number of the call is the trigger number, which is not limited in this embodiment of the present disclosure.

Exemplarily, the trigger number includes a fixed-line phone number and a mobile phone number, and a specific form of the trigger number is not limited in this embodiment of the present disclosure.

Step 204: The first user equipment determines whether a ring parameter corresponding to the number of the call meets a preset condition, and if the ring parameter meets the preset condition, performs step 205, and if the ring parameter does not meet the preset condition, ends the process.

Optionally, the ring parameter may be acquired in advance, and a specific acquiring process includes, but is not limited to, the following manners. Receiving a ring parameter sent by a server, or locally receiving a setting instruction input by user equipment, and setting a ring parameter according to the setting instruction.

The ring parameter may include, but is not limited to, a quantity of rings and/or duration of a ring, and determining whether a ring parameter corresponding to the number of the call meets a preset condition if the ring parameter is the quantity of rings may be performing statistics on a quantity of rings within a preset time, and determining whether the quantity of rings is greater than or equal to a preset quantity, and if the quantity of rings is greater than or equal to the preset quantity, performing step 205, and if the quantity of rings is less than the preset quantity, ending the process. The preset quantity is not limited in this embodiment, for example, the preset quantity may be 3, 4, 5, or the like.

If the ring parameter is the duration of the ring, determining whether a ring parameter corresponding to the number of the call meets a preset condition may include recording a first time when the ring starts and a second time when the ring ends, and acquiring the duration of the ring according to the first time and the second time, determining whether the duration of the ring is greater than or equal to a preset time, performing step 205 if the duration is greater than or equal to the preset time, and ending the process if the quantity of rings is less than the preset time. The preset time is not further limited in this embodiment, for example, the preset time may be 5 seconds (s), 6 s, 7 s, or the like.

The first user equipment may determine, by determining whether the ring parameter corresponding to the number of the call is greater than or equal to the preset condition, that the user cannot answer the current call such that in a scenario in which the user can answer the first user equipment, the first user equipment is prevented from transferring the current call to the first user equipment to second user equipment corresponding to the phone number of the current call because the user does not answer the current call in time.

Optionally, in order to prevent the first user equipment from transferring the call to the first user equipment to the second user equipment because the user does not answer the call to the first user equipment because the preset condition does not accord with an actual situation in the scenario 2, a minimum value of the preset condition may be set such that the preset condition set by the first user equipment according to the setting instruction input by the user is not less than the minimum value.

Optionally, after step 204, the first user equipment may also determine whether a time of the current call is within a working period, and if the time of the current call is within the working period, perform step 205, and if the time of the current call is not within the working period, end the process. A specific determining process may include acquiring, by the first user equipment, the time of the current call, and comparing the time of the current call with a preset working period, and determining, according to a comparison result, whether the time of the current call is within the working period. A process of setting the working period may include that the first user equipment may display a time setting interface for the user, receive a time setting instruction triggered by the user on the time setting interface, and set a period indicated by the time setting instruction to the working period, or the first user equipment performs statistics on locations of the first user equipment in different periods, determines that a location that appears most frequently in a first time and a second time is a working place, and sets a period corresponding to the working place to the working period.

Besides the foregoing two manners for setting a working period, user equipment may set the working period in another manner, which is not limited in this embodiment of the present disclosure.

The first user equipment determines that the time of the call is within the working period and transfers the call to the first user equipment to the second user equipment corresponding to the number of the call such that when the second user equipment is a device used by the user during working, a user is prevented from missing an important call within a working time and a call that is not within the working time is prevented from being transferred to the second user equipment corresponding to the number of the call.

Optionally, the first user equipment may also determine whether a location of the first user equipment is a first location, perform step 205 if the location of the first user equipment is the first location, and end the process if the location of the first user equipment is not the first location. A process in which the first user equipment determines whether the location of the first user equipment is the first location may include acquiring, by the first user equipment, the location of the first user equipment, where the first user equipment may acquire the location of the first user equipment using a global positioning system (GPS), cellular network cell identifier (Cell ID) positioning, Wi-Fi positioning, and the like, and the first user equipment may also acquire the location of the first user equipment in another manner, which is not limited in this embodiment of the present disclosure, and determining, by the first user equipment, whether the location of the first user equipment is the preset first location, performing step 205 if the location is the first location, and ending the process if the location is not the first location.

Optionally, the first user equipment may perform matching between the location of the first user equipment and the first location, and determine, according to a matching result, whether the location of the first user equipment is the first location, or the first user equipment may also preset a location determining algorithm, input the location of the first user equipment to the location determining algorithm, and then determine, according to an output result of the location determining algorithm, whether the location of the first user equipment is the first location.

In addition, the first user equipment may also determine, in another manner, whether the location of the first user equipment is the first location, which is not limited herein.

A process of setting the first location may include that the first user equipment may display a location setting interface for the user, then receive a location setting instruction triggered by the user on the location setting interface, and set a location indicated by the location setting instruction to the first location, or the first user equipment performs statistics on locations of the first user equipment in a first time, determines that a location that appears most frequently in the first time is the first location, and stores the first location.

In addition, the first user equipment may also set and store the first location in another manner, which is not limited in this embodiment of the present disclosure.

It is determined that the location of the first user equipment is the preset first location and the call to the first user equipment is transferred to the second user equipment corresponding to the number of the call such that in the scenario 1, the user can use the second user equipment to answer, at the second location, the call to the first user equipment at the first location, thereby preventing the user from missing an important call because the user cannot answer the first user equipment.

It should be noted that, in an actual application, either or both of determining whether the time of the call is within the working period and determining whether the location of the first user equipment is the first location may be performed. If both are performed, after it is determined whether the time of the call is within the working period, it may be determined whether the location of the first user equipment is the first location, and after it is determined that the location of the first user equipment is the first location, step 205 is performed, or after it is determined that the location of the first user equipment is the first location, it may be determined whether the time of the call is within the working period, and after it is determined that the time of the call is a working time, step 205 is performed, or determining whether the time of the call is within the working period and the determining whether the location of the first user equipment is the first location may be performed, and after it is determined that the time of the call is within the working period and it is determined that the location of the first user equipment is the first location, step 205 is performed. An order of determining whether the time of the call is within the working period and determining whether the location of the first user equipment is the first location is not limited in this embodiment.

Step 205: The first user equipment sends a call transfer instruction to a server.

Optionally, the first user equipment sends the call transfer instruction to the server, where the call transfer instruction may include a DTMF sequence of the trigger number, and the call transfer instruction is used to instruct the server, after receiving the call transfer instruction, to transfer the call to the first user equipment to the second user equipment corresponding to the trigger number.

Optionally, after the call to the first user equipment is successfully transferred to the second user equipment corresponding to the trigger number, first prompt information used to indicate that the call to the first user equipment is already transferred to the second user equipment may be sent to the second user equipment.

Optionally, after the call to the first user equipment is transferred to the second user equipment corresponding to the trigger number, the first user equipment may also periodically display transfer-completion prompt information used to indicate that the call to the first user equipment is already transferred to the second user equipment, and in the scenario 2, when the user can use the first user equipment, the user may stop a call transfer function of the first user equipment on the first user equipment after acquiring the transfer-completion prompt information. Exemplarily, the transfer-completion prompt information may include, but is not limited to, audio information.

Optionally, because the first user equipment can only transfer the call to the second user equipment, in order to not to miss any important short message service message on the first user equipment, after receiving a short message service message, the first user equipment may also send, to a sender of the short message service message, second prompt information used to indicate that the call to the first user equipment is already transferred to the second user equipment. In order to reduce resources of the first user equipment, at least one important number may be preset, and after a short message service message is received, it is determined whether a phone number of a sender that sends the short message service message is an important number, the second prompt information used to indicate that the call to the first user equipment is already transferred to the second user equipment is sent to the sender if the phone number of the sender is an important number, and no processing is performed on the short message service message if the phone number of the sender is not an important number.

Optionally, the trigger number may be further reset after the first user equipment receives a resetting instruction input by the user. The trigger number may be added or deleted. A specific process may include that the first user equipment may display a number resetting interface for the user, then receive a resetting instruction triggered by the user on the number resetting interface, and add or delete the trigger number according to the resetting instruction.

It should be noted that "first" and "second" in this embodiment of the present disclosure are merely used to differentiate the difference between them but not specific references.

This embodiment of the present disclosure provides a call transfer method and user equipment such that when a number of a call is a trigger number and it is determined that a ring parameter corresponding to the number of the call meets a preset condition, the call to first user equipment is transferred, thereby improving accuracy of call transfer and improving an interactive capability of the user equipment.

Figure 3:
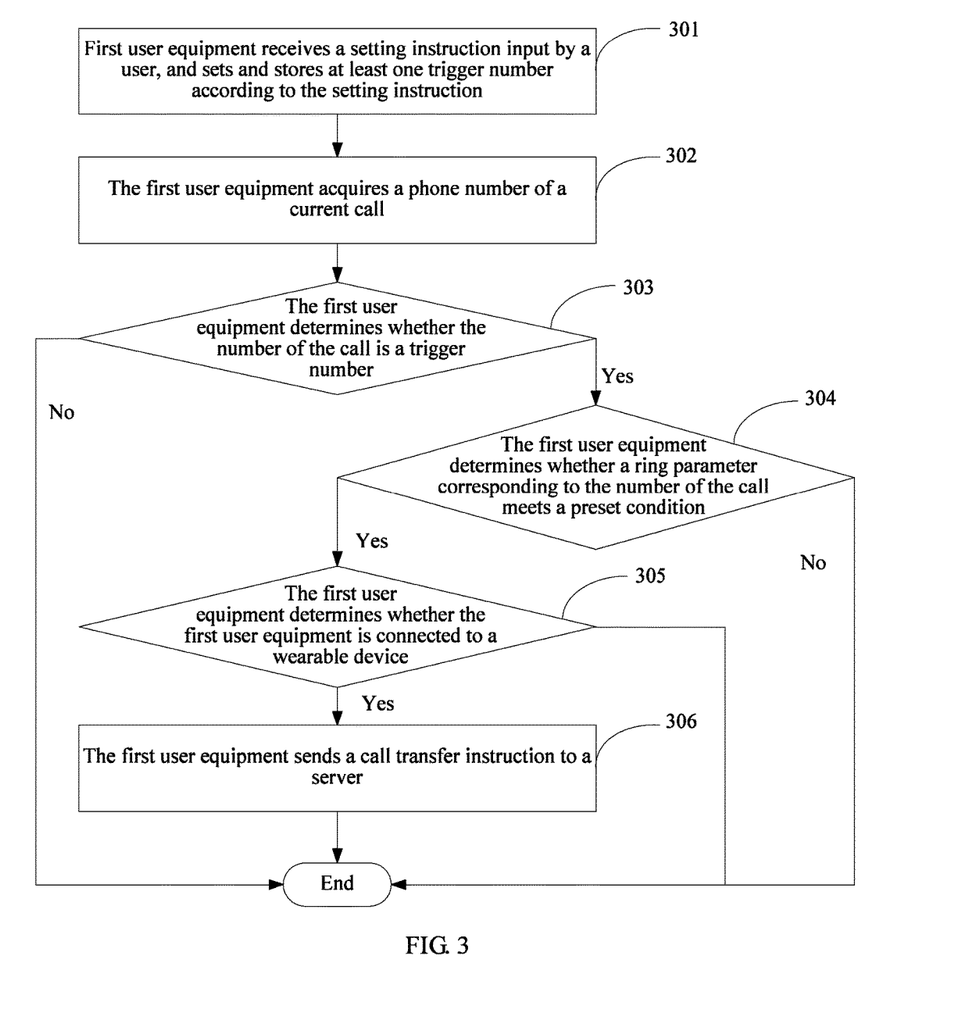
FIG. 3 is a flowchart of a call transfer method according to another embodiment of the present disclosure.

Another embodiment of the present disclosure provides a call transfer method, and a difference from the foregoing embodiment is that user equipment to which the method is applied may be in a wireless connection to a wearable device wore by a user, where the wearable device has a call prompt function, and the wearable device may include, but is not limited to, a BLUETOOTH device, and the wearable device and first user equipment have same account information, that is, the wearable device may share, view, or edit information, a call, an instant message, or the like on the first user equipment. Referring to FIG. 3, the method includes the following steps.

Step 301: First user equipment receives a setting instruction input by a user, and sets and stores at least one trigger number according to the setting instruction.

This step is the same as step 201 in the foregoing embodiment, and details are not described herein again.

Step 302: The first user equipment acquires a phone number of a current call.

This step is the same as step 202 in the foregoing embodiment, and details are not described herein again.

Step 303: The first user equipment determines whether the number of the call is a trigger number, performs step 304 if the number of the call is the trigger number, and ends the process if the number of the call is not the trigger number.

This step is the same as step 203 in the foregoing embodiment, and details are not described herein again.

Step 304: The first user equipment determines whether a ring parameter corresponding to the number of the call meets a preset condition, performs step 305 if the ring parameter meets the preset condition, and ends the process if the ring parameter does not meet the preset condition.

This step is the same as step 204 in the foregoing embodiment, and details are not described herein again.

Optionally, after step 304, the first user equipment may also determine whether a time of the current call is within a working period, perform step 305 if the time of the current call is within the working period, and end the process if the time of the current call is not within the working period. A specific determining process is the same as that in the foregoing embodiment, and details are not described herein again.

Optionally, the first user equipment may also determine whether a location of the first user equipment is a first location, perform step 305 if the location of the first user equipment is the first location, and end the process if the location of the first user equipment is not the first location. A specific determining process is the same as that in the foregoing embodiment, and details are not described herein again.

The first user equipment determines that the time of the call is within the working period and transfers the call to the first user equipment to second user equipment corresponding to the number of the call such that when the second user equipment is a device used by the user during working, a user is prevented from missing an important call within a working time and a call that is not within the working time is prevented from being transferred to the second user equipment corresponding to the number of the call.

It is determined that the location of the first user equipment is the preset first location and the call to the first user equipment is transferred to the second user equipment corresponding to the number of the call such that in the scenario 1, the user can use the second user equipment to answer, at a second location, the call to the first user equipment at the first location, thereby preventing the user from missing an important call because the user cannot answer the first user equipment.

Step 305: The first user equipment determines whether the first user equipment is connected to a wearable device, performs step 306 if the first user equipment is not connected to the wearable device, and ends the process if the first user equipment is connected to the wearable device.

Further, the first user equipment may determine, according to device information of all devices connected to the first user equipment, whether the first user equipment is connected to the wearable device.

Because when another device is connected to the first user equipment, the first user equipment stores device information of the other device connected to the first user equipment. Exemplarily, the device information may be a media access control (MAC) address or a name of the other device.

It should be noted that, in an actual application, any one or three of determining whether the time of the call is within the working period, determining whether the location of the first user equipment is the first location, and determining whether the user equipment is connected to the wearable device may be performed. If the three are performed, after it is determined whether the time of the call is a working time and it is determined that the location of the first user equipment is the first location, it may be determined whether the user equipment is connected to the wearable device, and after it is determined that the user equipment is not connected to the wearable device, step 305 is determined to be performed, or after it is determined that the location of the first user equipment is the first location and it is determined that the time of the call is within the working period, it may be determined whether the user equipment is connected to the wearable device, and after it is determined that the user equipment is not connected to the wearable device, step 305 is performed, or determining whether the time of the call is within the working period, determining whether the location of the first user equipment is the first location, and determining whether the user equipment is connected to the wearable device may be performed, and after it is determined that the time of the call is within the working period, it is determined that the location of the first user equipment is the first location, and it is determined that the user equipment is not connected to the wearable device, step 305 is performed. An order of determining whether the time of the call is within the working period, determining whether the location of the first user equipment is the first location, and determining that the user equipment is not connected to the wearable device is not limited in this embodiment.

Step 306: The first user equipment sends a call transfer instruction to a server.

This step is the same as step 205 in the foregoing embodiment, and details are not described herein again.

Optionally, because the first user equipment is connected to the wearable device mainly in a wireless connection manner, an effective distance of the wireless connection can ensure that the user can answer the call to the first user equipment within the effective distance, and the wearable device has a call prompt function. After the first user equipment is connected to the wearable device, the call to the first user equipment may be prompted to the user using the call prompt function of the wearable device. Therefore, after the first user equipment detects that the first user equipment is reconnected to the wearable device, a call transfer function of the first user equipment may be stopped.

Optionally, after the call to the first user equipment is successfully transferred to the second user equipment corresponding to the number of the call, first prompt information used to indicate that the call to the first user equipment is already transferred to the second user equipment may be sent to the second user equipment.

Optionally, after the call to the first user equipment is transferred to the second user equipment corresponding to the number of the call, the first user equipment may also periodically display transfer-completion prompt information used to indicate that the call to the first user equipment is already transferred to the second user equipment, and in the scenario 2, when the user can use the first user equipment, the user may stop the call transfer function of the first user equipment on the first user equipment after acquiring the transfer-completion prompt information. Exemplarily, the prompt information includes, but is not limited to, audio information.

Optionally, because the first user equipment can only transfer the call to the second user equipment, in order not to miss any important short message service message on the first user equipment, after receiving a short message service message, the first user equipment may also send, to a sending device of the short message service message, second prompt information used to indicate that the call to the first user equipment is already transferred to the second user equipment. In order to reduce resources of the first user equipment, at least one important number may be preset, and after a short message service message is received, it is determined whether a phone number of a sending device that sends the short message service message is an important number, the second prompt information used to indicate that the call to the first user equipment is already transferred to the second user equipment is sent to the sender if the phone number of the sending device is an important number, and no processing is performed on the short message service message if the phone number of the sending device is not an important number.

Optionally, after the first user equipment receives a resetting instruction input by the user, the trigger number may be further reset. The trigger number may be added or deleted.

It should be noted that "first" and "second" in this embodiment of the present disclosure are merely used to differentiate the difference between them but not specific references.

This embodiment of the present disclosure provides a call transfer method such that when a number of a call is a trigger number and a ring parameter corresponding to the number of the call meets a preset condition, the call to first user equipment is transferred, thereby improving accuracy of call transfer and improving an interactive capability of the user equipment.

Figure 4:
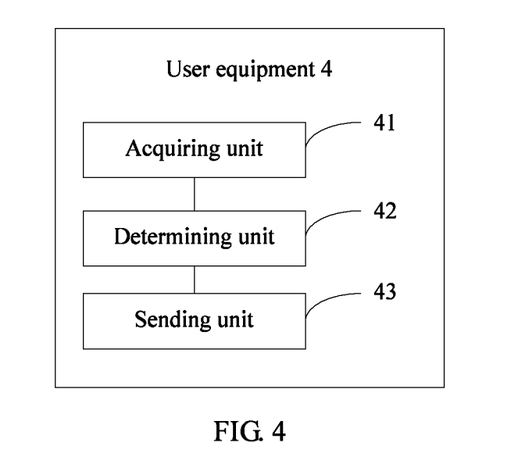
FIG. 4 is a schematic structural diagram of user equipment according to another embodiment of the present disclosure.

Another embodiment of the present disclosure provides user equipment 4, where the user equipment 4 is configured to perform the call transfer method provided by any embodiment of the embodiments shown in FIG. 1 to FIG. 3. Referring to FIG. 4, the user equipment 4 includes an acquiring unit 41 configured to acquire a phone number of a current call to first user equipment, a determining unit 42 configured to determine whether the phone number of the current call is a trigger number, where when the phone number of the current call is the trigger number, the determining unit 42 is further configured to determine whether a ring parameter corresponding to the number of the call meets a preset condition, where the ring parameter includes a quantity of rings and/or duration of a ring, and a sending unit 43 configured to send a call transfer instruction to a server if the ring parameter corresponding to the number of the call meets the preset condition, where the call transfer instruction is used to instruct the server to transfer, after receiving the call transfer instruction, the call to the first user equipment to second user equipment corresponding to the number of the call.

Optionally, the determining unit 42 is further configured to perform at least one of determining that a time of the current call is within a working period, determining that a location of the first user equipment is a preset location, and determining that the first user equipment is not connected to a wearable device.

Optionally, the user equipment 4 further includes a setting unit (not shown), where the setting unit is configured to receive a setting instruction input by a user, and set and store at least one trigger number according to the setting instruction.

Optionally, the sending unit 43 is further configured to send first prompt information to the second user equipment, where the first prompt information is used to indicate that the call to the first user equipment is already transferred to the second user equipment.

Optionally, the sending unit 43 is further configured to send second prompt information to a sending device that sends the short message service message after receiving a short message service message, where the second prompt information is used to indicate that the call to the first user equipment is already transferred to the second user equipment.

This embodiment of the present disclosure provides user equipment such that when a number of a call is a trigger number and a ring parameter corresponding to the number of the call meets a preset condition, the call to first user equipment is transferred, thereby improving accuracy of call transfer and improving an interactive capability of the user equipment.

Figure 5:
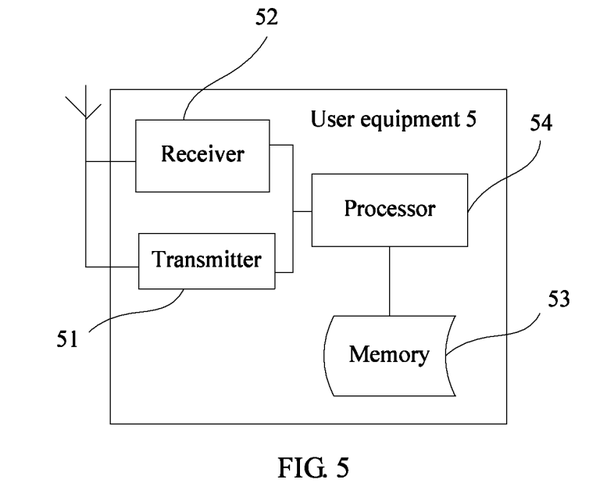
FIG. 5 is a schematic structural diagram of user equipment according to another embodiment of the present disclosure.

Another embodiment of the present disclosure provides user equipment 5, where the user equipment 5 is configured to perform the call transfer method provided by any embodiment of the embodiments shown in FIG. 1 to FIG. 3. Referring to FIG. 5, the user equipment 5 includes a transmitter 51, a receiver 52, a memory 53, and a processor 54 that communicates separately with the transmitter 51, the receiver 52, and the memory 53. Certainly, the user equipment 5 may further include common components such as an antenna, a baseband processing component, an intermediate radio frequency processing component, and an input/output apparatus, which is not limited in this embodiment of the present disclosure.

The processor 54 is configured to acquire a phone number of a current call to first user equipment, determine whether the phone number of the current call is a trigger number, and determine whether a ring parameter corresponding to the number of the call meets a preset condition if the phone number of the current call is the trigger number, where the ring parameter includes a quantity of rings and/or duration of a ring.

The transmitter 51 is configured to send a call transfer instruction to a server if the ring parameter corresponding to the number of the call meets the preset condition, where the call transfer instruction is used to instruct the server to transfer, after receiving the call transfer instruction, the call to the first user equipment to second user equipment corresponding to the number of the call.

Optionally, before sending the call transfer instruction to the server, the processor 54 is configured to perform at least one of determining that a time of the current call is within a working period, determining that a location of the first user equipment is a preset location, and determining that the first user equipment is not connected to a wearable device.

Optionally, before determining whether the phone number of the current call is the trigger number, the processor 54 is further configured to receive a setting instruction input by a user, and set and store at least one trigger number according to the setting instruction.

Optionally, the transmitter 51 is further configured to send first prompt information to the second user equipment, where the first prompt information is used to indicate that the call to the first user equipment is already transferred to the second user equipment.

Optionally, the receiver 52 is configured to receive a short message service message, and after the receiver 52 receives the short message service message, the transmitter 51 is further configured to send second prompt information to a sending device that sends the short message service message, where the second prompt information is used to indicate that the call to the first user equipment is already transferred to the second user equipment.

This embodiment of the present disclosure provides a call transfer method such that when a number of a call is a trigger number and a ring parameter corresponding to the number of the call meets a preset condition, the call to first user equipment is transferred, thereby improving accuracy of call transfer and improving an interactive capability of the user equipment.

It should be noted that, terms such as call forwarding and incoming call transfer mentioned in the embodiments of the present disclosure all have a same meaning, and in actual applications, call forwarding and incoming call transfer may be replaced by terms such as call diverting, incoming call forwarding, incoming call diverting, call diverting, call transfer and call forwarding.

When the user equipment provided by the foregoing embodiments performs call transfer, division of the foregoing function modules is merely used as an example for description, and in actual applications, the foregoing functions can be allocated to different function modules and implemented according to the need, that is, an internal structure of an apparatus and a device is divided into different function modules to implement all or some of the functions described above. In addition, the user equipment and the call transfer method embodiment that are provided by the embodiments belong to a same concept, and for a specific implementation process, refer to the method embodiment, and details are not described herein again.

The sequence numbers of the foregoing embodiments of the present disclosure are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A call transfer method implemented by a first user equipment, comprising:
   receiving a trigger number identifying a phone number of a caller device;
   acquiring the phone number of a current call being received by the first user equipment;
   determining that the phone number of the current call is the trigger number;
   determining that a ring parameter corresponding to the phone number of the current call meets a preset condition in response to the phone number of the current call being the trigger number, wherein the ring parameter comprises a quantity of rings of the current call or a duration of a ring of the current call;
   determining that the first user equipment is not connected to a wearable device; and
   sending a call transfer instruction to a server in response to the ring parameter corresponding to the phone number of the current call meeting the preset condition and the first user equipment not being connected to the wearable device, wherein the call transfer instruction is an instruction for the server to transfer the current call to a second user equipment associated with the first user equipment.

2. The method according to claim 1, wherein before sending the call transfer instruction to the server, the method further comprises at least one of the following:
   determining that a time of the current call is within a working period; or
   determining that a location of the first user equipment is a preset location.

3. The method according to claim 1, wherein before determining that the phone number of the current call is the trigger number, the method further comprises the trigger number according to setting instructions received via the user interface.

4. The method according to claim 1, wherein after sending the call transfer instruction to the server, the method further comprises sending prompt information to the second user equipment, wherein the prompt information indicates that the current call is already transferred to the second user equipment.

5. The method according to claim 1, wherein after sending the call transfer instruction to the server, the method further comprises:
   receiving a short message service message from the second user equipment;
   sending prompt information to the second user equipment after receiving the short message service message, wherein the prompt information indicates that the current call is already transferred to the second user equipment.

6. A first user equipment, comprising:
   a transmitter;
   a receiver coupled to the transmitter;
   a memory coupled to the receiver and the transmitter; and
   a processor coupled to the memory,
   wherein the memory stores a set of program code,
   wherein the processor is configured to invoke the program code stored in the memory to cause the user equipment to:
     receive a trigger number identifying a phone number of a caller device;
     acquire the phone number of a current call being received by the first user equipment;
     determine that the phone number of the current call is the trigger number; and
     determine that a ring parameter corresponding to the phone number of the current call meets a preset condition in response to the phone number of the current call being the trigger number, wherein the ring parameter comprises a quantity of rings of the current call or a duration of a ring of the current call; and
     determine that the first user equipment is not connected to a wearable device; and
   wherein the transmitter is configured to send a call transfer instruction to a server in response to the ring parameter corresponding to the phone number of the current call meeting the preset condition and the first user equipment not being connected to the wearable device, wherein the call transfer instruction is an instruction for the server to transfer the current call to a second user equipment associated with the first user equipment.

7. The user equipment according to claim 6, wherein before sending the call transfer instruction to the server, the processor is further configured to cause the user equipment to perform at least one of the following operations:
   determine that a time of the current call is within a working period;
   determine that a location of the first user equipment is a preset location; or
   determine that the first user equipment is not connected to a wearable device.

8. The user equipment according to claim 6, wherein before determining whether the phone number of the current call is the trigger number, the processor is further configured to cause the user equipment to store the trigger number in the memory according to a setting instruction received via the user interface.

9. The user equipment according to claim 6, wherein the transmitter is further configured to send prompt information to the second user equipment, wherein the first prompt information indicates that the current call is already transferred to the second user equipment.

10. The user equipment according to claim 6, wherein the receiver is configured to receive a short message service message from the second user equipment, and wherein after the receiver receives the short message service message, the transmitter is further configured to send prompt information to the second user equipment, wherein the second prompt information indicates that the current call is already transferred to the second user equipment.

11. The method according to claim 2, wherein before determining that the phone number of the current call is the trigger number, the method further comprises:
receiving a setting instruction input by a user; and
storing the trigger number according to the setting instruction.

12. The method according to claim 2, wherein after sending the call transfer instruction to the server, the method further comprises sending prompt information to the second user equipment, wherein the first prompt information indicates that the current call is already transferred to the second user equipment.

13. The method according to claim 3, wherein after sending the call transfer instruction to the server, the method further comprises sending prompt information to the second user equipment, wherein the prompt information indicates that the current call is already transferred to the second user equipment.

14. The method according to claim 2, wherein after sending the call transfer instruction to the server, the method further comprises sending prompt information to the second user equipment in response to receiving a short message service message from the second user equipment, wherein the prompt information indicates that the current call is already transferred to the second user equipment.

15. The method according to claim 3, wherein after sending the call transfer instruction to the server, the method further comprises sending prompt information to the second user equipment in response to receiving a short message service message from the second user equipment, wherein the prompt information indicates that the current call is already transferred to the second user equipment.

16. The user equipment according to claim 7, wherein before determining that the phone number of the current call is the trigger number, the processor is further configured to cause the user equipment to:
receive a setting instruction input by a user; and
store the trigger number in the memory according to the setting instruction.

17. The user equipment according to claim 7, wherein the transmitter is further configured to send prompt information to the second user equipment, wherein the prompt information indicates that the current call is already transferred to the second user equipment.

18. The user equipment according to claim 8, wherein the transmitter is further configured to send prompt information to the second user equipment, wherein the prompt information indicates that the current call is already transferred to the second user equipment.

19. The user equipment according to claim 7, wherein the transmitter is further configured to send prompt information to after the second user equipment in response to the receiver receiving a short message service message from the second user equipment, wherein the prompt information indicates that the current call is already transferred to the second user equipment.

20. The user equipment according to claim 8, wherein the transmitter is further configured to send prompt information to the second user equipment in response to the receiver receiving a short message service message, wherein the prompt information indicates that the current call is already transferred to the second user equipment.

* * * * *